United States Patent [19]
Saito et al.

[11] Patent Number: 5,675,131
[45] Date of Patent: Oct. 7, 1997

[54] SPEAKER SYSTEM AND THE SAME FOR TELEVISION SETS

[75] Inventors: Hitoshi Saito; Hitoshi Sango, both of Saitama-ken, Japan

[73] Assignee: Kabushiki Kaisha Toshiba, Kawasaki, Japan

[21] Appl. No.: 685,759

[22] Filed: Jul. 24, 1996

Related U.S. Application Data

[63] Continuation of Ser. No. 357,239, Dec. 13, 1994, abandoned.

[30] Foreign Application Priority Data

Dec. 16, 1993 [JP] Japan .................................. 5-317040
Dec. 16, 1993 [JP] Japan .................................. 5-317041

[51] Int. Cl.$^6$ .................................................. H05K 5/00
[52] U.S. Cl. .......................... 181/152; 181/155; 181/156; 181/141
[58] Field of Search .......................... 181/152, 155, 181/156, 141, 199; 381/188, 205

[56] References Cited

U.S. PATENT DOCUMENTS

| | | | |
|---|---|---|---|
| 2,825,419 | 3/1958 | Stephens . | |
| 2,880,817 | 4/1959 | Burns et al. | 181/156 |
| 3,978,941 | 9/1976 | Siebert | 181/156 X |
| 4,168,762 | 9/1979 | Griffin, Jr. | 181/199 X |
| 4,926,487 | 5/1990 | Yoshida et al. | 381/205 X |
| 4,987,601 | 1/1991 | Goto | 181/156 X |
| 5,036,946 | 8/1991 | Yoshino | 181/156 |
| 5,119,429 | 6/1992 | Chatelain | 381/188 X |
| 5,229,555 | 7/1993 | Inoue et al. | 181/152 X |
| 5,274,709 | 12/1993 | Koizumi | 381/188 X |
| 5,313,525 | 5/1994 | Klasco | 181/156 X |
| 5,361,380 | 11/1994 | You et al. | 381/205 X |

FOREIGN PATENT DOCUMENTS

| | | |
|---|---|---|
| 0 462 571 A1 | 12/1991 | European Pat. Off. . |
| 0 519 509 A2 | 12/1992 | European Pat. Off. . |
| 9102192 U | 6/1991 | Germany . |
| 1-135295 | 5/1989 | Japan . |
| 3-94598 | 4/1991 | Japan . |
| 2 195218 | 3/1988 | United Kingdom . |

*Primary Examiner*—Khanh Dang
*Attorney, Agent, or Firm*—Cushman, Darby & Cushman IP Group of Pillsbury Madison & Sutro LLP

[57] ABSTRACT

As the front surface diaphragm of the speaker is provided with a first acoustic waveguide and the rear surface diaphragm is provided with a back cavity reflecting sound waves and a second acoustic waveguide guiding the reflected sound waves, a mass of air by the first acoustic waveguide will be applied to the front surface diaphragm, substantially the same load as to the rear surface diaphragm, the acoustic loads in the front and rear of the diaphragm will be balanced, the sound waves of the low frequency ranges will be able to be efficiently discharged on substantially the same level from both acoustic waveguides and sounds having an expansion and presence will be able to be obtained. Further, as the front surface of the diaphragm of the speaker arranged in the television set is provided with a first acoustic waveguide and the rear surface of the speaker diaphragm is provided with a second acoustic waveguide and the sound radiating mouth of the second acoustic waveguide is arranged, for example, on the top surface of the television set, the sound reproducing band will be able to be expanded by using the sounds of the front surface of the speaker diaphragm and the sounds of the rear surface with one speaker and television sounds having an expansion and presence will be able to be obtained.

14 Claims, 15 Drawing Sheets

- 55 SECOND ACOUSTIC WAVEGUIDE
- 56 MOUTH
- 50 SPEAKER SYSTEM
- 54 BACK CAVITY
- 52 FIRST ACOUSTIC WAVEGUIDE
- 51 SPEAKER
- 53 MOUTH

- 51a FRONT SURFACE DIAPHRAGM
- 51b REAR SURFACE DIAPHRAGM
- 54b REFLECTING SURFACE

SPEAKER SYSTEM AND THE SAME FOR TELEVISION SETS

This is a continuation of application Ser. No. 08/357,239, filed on Dec. 13, 1994, which was abandoned.

BACKGROUND OF THE INVENTION

1. Field of the Invention

This invention relates to speaker systems, particularly those for television sets and still more particularly to a speaker system wherein acoustic waveguides guiding sound waves are disposed respectively in front of and behind of a speaker diaphragm so that a reproducing band may be expanded and a stereoscopic sound field may be reproduced.

2. Description of the Related Art

FIG. 16 is a perspective view showing a conventional sealed type speaker system. FIG. 17 shows frequency characteristics of the same.

In the speaker system shown in FIG. 16, a speaker 1 is fixed to a box 2 so that, when an input signal is applied to the speaker 1, the diaphragm 3 will vibrate and sound waves will be radiated on the front surface.

In this case, the front of the diaphragm 3 will be a free space and the added mass applied to the front portion of the diaphragm 3 will be determined by the following formula:

$$8/3 \, \rho a^3 \qquad (1)$$

wherein $\rho$ represents the density of air and a represents the radius of the diaphragm 3.

In the formation in FIG. 16, there have been problems that, when the caliber is of a radius of about 12 cm., the added mass applied to the diaphragm 3 of the speaker 1 will be so small that, in the conventional sealed type speaker system, the limit of the reproduction of the low frequency range will be determined by the size of the speaker 1 and the inside volume of the box 2 and, with a small slim box, the bass sound will not be reproduced well.

In order to solve such problems, an acoustic waveguide 13 having a mouth 14 smaller than the area of a front surface diaphragm 12 is arranged on the front surface of a speaker 11 as shown in FIG. 18. In this formation, when the mass of air is applied on the front surface of the speaker diaphragm 12, it will become an added mass, the lowest resonance frequency will reduce, the low frequency range will be pulled down and the sound reproducing band will be expanded. The reference numeral 16 represents a sound absorbing material for preventing the resonance of the acoustic waveguide 13 and its interior.

However, the sound frequency characteristics in the mouth 14 of the acoustic waveguide 13 will be as shown in FIG. 19 and the sound frequency characteristics in the rear surface diaphragm 15 of the speaker 11 will be as shown in FIG. 20. In the frequency characteristic levels of both, the rear surface diaphragm 15 is larger in the area than the mouth 14 of the front surface diaphragm 12, the sound pressure level of the rear surface of the diaphragm is higher than the sound pressure level on the front surface side and the sound pressure balance in front and rear of the diaphragm has been bad. Particularly, the sound pressure level in the low frequency range has been lower in the rear surface diaphragm 15. Thereby, the sounds radiated from the front surface of the diaphragm will be masked by the midrange and high frequency sound from the rear surface of the diaphragm and will become unclear sound.

Therefore, as shown in FIG. 21, a back cavity 17 and a duct 18 have been arranged on the rear surface of diaphragm 15 in the formation in FIG. 18 to utilize the resonance of the duct 18 to reproduce bass sound. However, as the duct 18 is used, the internal volume of the back cavity 17 will become large and it has been difficult reduce the size thereof. Also, conventionally the sound absorbing material 19 for preventing standing waves has been contained in the back cavity 17 to increase the cost.

On the other hand, in various acoustic instruments for enjoying a stereo sense, usually, in a sealed type speaker system, the apex of an equilateral triangle having right and left speakers as one side has been the best position to enjoy a stereo sound image but recently the method of enjoying a stereophonic feeling has varied from the method of listening in the front position to a sound field type speaker system for freely enjoying music tending to increase.

FIG. 22 shows a conventional sound field type speaker system. In FIG. 22, a main speaker 22 is fixed to the front portion of a box 21, a sound field speaker 23 is fixed to the box 21 on the upper surface and a reflector 24 is fitted on the sound field speaker 23 by means of fitting members 25.

In the formation in FIG. 22, when an input signal is applied to the main speaker 22 and sound field speaker 23, the main speaker diaphragm 26 and sound field speaker diaphragm 27 will vibrate and sound waves will be radiated. Here, the sound field speaker 23 will diffuse sound waves in the 360 degree directions with the reflector 24 to give an expansion and presence and the main speaker 22 will give a localization.

However, even in the case of FIG. 22, the same as in the case of FIG. 16, there have been such problems that the added mass applied to the main speaker diaphragm 26 on the front surface will be determined by the above mentioned formula (1), therefore the limit of reproducing the low frequency range will be determined by the size of the main speaker and the inside volume of the box 21 and the bass sound will not be well reproduced with a small slim type speaker box. Also, as two or more of the main speakers 22 and sound field speakers 23 are required, the cost will be high.

As mentioned above, conventionally, there have been such problems that, with the small slim box type speaker system, the bass sound will not be able to be well reproduced, with the system of arranging an acoustic waveguide on the front surface of the speaker, the sound pressure balance in front and rear of the diaphragm will be bad and the sound in the low frequency range will not be sufficient and will be unclear in sound quality. Further, with the sound field speaker system, in the same manner, the bass sound will not be well reproduced and, with such one channel as in the stereo system, two or more speakers will be required and will be disadvantageous in the cost.

On the other hand, generally, the speaker arranging place in the television set is taken mostly by the cathode ray tube setting space and is on both sides of or above or below the cathode ray tube picture surface.

Recently, as the picture tends to become large and wide, the appearance design of the television set will also tend to become slim and the form of the speaker reproducing sounds will also have to tend to become thin.

However, with a speaker in which the width dimension of the diaphragm is made small, in view of the diaphragm area and the vibrating system supporting method, the low frequency sound reproducing capacity will be difficult. Therefore, a method wherein an acoustic waveguide is arranged on the front surface of the speaker so that the sound waves coming out of the diaphragm of the speaker may be guided to the sound radiating mouth has been already variously developed as a method of making a television set slim.

However, with the speaker system of such a television set, it is usual to convert the pressure within the acoustic waveguide and mouth to improve the performance of the sounds radiated from the mouth of the acoustic waveguide and, as the area of the sound radiating mouth becomes smaller than the area of the diaphragm of the used speaker, the sound pressure level radiated from the mouth will also reduce and will be insufficient in respect of the sound volume feeling and sound field feelinng.

FIGS. 23 and 24 show a speaker system of a conventional television set.

In FIG. 23, the reference numeral 30 represents a television set and, within a television set cabinet 31, right and left channel speakers 34 and 33 are arranged respectively in the right and left positions on both sides of a cathode ray tube 32. Acoustic waveguides 36 and 35 are fitted respectively to the right and left channel speakers 34 and 33 on the front portions and sound radiating mouths 38 and 37 of the right and left acoustic waveguides 36 and 35 are respectively arranged near a front panel (front picture frame) of the television cabinet 31.

In the formation in FIG. 23, as a back cabinet is not arranged in the rear of the speakers 33 and 34, the sounds radiated from the diaphragms in the rear of the speakers will be radiated from ventilating holes 39 and 40 provided on the periphery of the television set cabinet 31. At this time, as the areas of the sound radiating mouths 37 and 38 are smaller than the diaphragm areas of the speakers 33 and 34 as mentioned above, when the sound pressure levels radiated from the sound radiating mouths 37 and 38 are reduced, the sound pressure levels radiated from the rear portions of the speakers will become larger, the sounds radiated around from the ventilating holes 39 and 40 will mask the front side sounds from the mouths 37 and 38, an unclear sound quality will be made and the right and left stereo separations will become bad.

Therefore, in case the sound quality is considered important, as in the formation shown in FIG. 24, back cabinets (sealed boxes) 42 and 41 will be often arranged in the rear of the right and left channel speakers 34 and 33 which are provided with the acoustic waveguides 36 and 35 in the front portions.

However, in the conventional example in FIG. 24, as the back cabinets 41 and 42 are formed in the limited space of the television set cabinet 31, the back cabinets 41 and 42 of large volumes will not be able to be formed. Therefore, there has been a defect that the low frequency reproducing range will be limited by the volume limitation of the back cabinets 41 and 42. There has been also a defect that the sounds generated from the rear portions of the speakers 33 and 34 will be enclosed by the back cabinets 41 and 42 and will not be radiated out, the sounds radiated out will be only from the sound radiating mouths 37 and 38 and the reproduced sound pressure level will be low.

As mentioned above, there have been problems that the sounds radiated from the front surface of the television set will become unclear and, in the system of arranging a back cabinet in the rear of a speaker, as a back cabinet of a large volume can not be formed, the low frequency reproducing range will be limited and, as the speaker is sealed in the rear, the reproduced sound pressure level will be low.

SUMMARY OF THE INVENTION

An object of the present invention is to provide a speaker system wherein even a small slim box type speaker system can effectively reproduce bass sound, a clear sound quality is obtained, an expansion and a presence are obtained, and the cost is advantageous.

Another object of the present invention is to provide a speaker system for television sets wherein the sounds radiated from the front and rear of a speaker within a television set do not interfere with each other, a sound quality high in the articulation is obtained, the sound reproducing band is wide, and sounds high in the presence can be reproduced.

A speaker system according to the first invention comprises:
 a speaker;
 a first acoustic waveguide guiding forward the sounds radiated on the front surface of a diaphragm of this speaker and radiating the sounds;
 a cavity reflecting the sounds radiated from the rear surface of the above mentioned speaker diaphragm; and
 a second acoustic waveguide guiding the sound waves reflected by this cavity in a direction different from forward and radiating the sound waves.

According to the first invention, as the front surface diaphragm of the speaker is provided with the first acoustic waveguide and the rear surface diaphragm is provided with the back cavity reflecting the sound waves and the second waveguide guiding the reflected sound waves, a mass of air by the first acoustic waveguide will be applied to the front surface diaphragm and substantially the same load as on the front surface diaphragm will be able to be applied to the rear surface diaphragm, a load balance in front and rear of the diaphragm will be obtained, the same level low frequency range will be able to be efficiently obtained, further the sound waves of all the bands will be able to be obtained respectively from the first and second acoustic waveguides, therefore the bass sound on the front side will not be masked by the midrange and high frequency sound on the rear side to be not of an unclear sound quality, as the sounds are radiated in respectively different directions, the sounds having an expansion and presence will be able to be reproduced and, as the number of the speakers may be small, a speaker system high in the cost performance will be able to be realized.

A speaker system for television sets according to the second invention comprises:
 a speaker arranged within a television set;
 a first acoustic waveguide guiding the sounds radiated on the front surface of the diaphragm of this speaker to the front of the above mentioned television set and radiating the sounds; and
 a second acoustic waveguide guiding the sounds radiated from the rear surface of the above mentioned speaker diaphragm in a direction different from forward of the above mentioned television set and radiating the sounds.

According to the second invention, the first acoustic waveguide is arranged on the front surface of the speaker diaphragm to radiate sounds on the front of the television set and, on the other hand, the second acoustic waveguide is arranged on the rear surface of the speaker diaphragm, guides the sounds in a direction different from forward of the television set and radiates the sounds, thereby the acoustic loads on the front surface and rear surface of the speaker diaphragm in the television set can be balanced, also, when the acoustic waveguides are arranged in front and rear of the speaker diaphragm, by the increase of the air load on the front and rear surfaces, the low resonant frequency f0 will fall and the reproducing band will be able to be expanded, therefore, the reproduced sound pressure in the television set will be able to be elevated, the reproduced sound band will be able to be made wide and sounds high in the presence will be able to be reproduced.

DETAILED DESCRIPTION OF THE PREFERRED EMBODIMENTS

The embodiments shall be explained with reference to the drawings.

Figure 1:
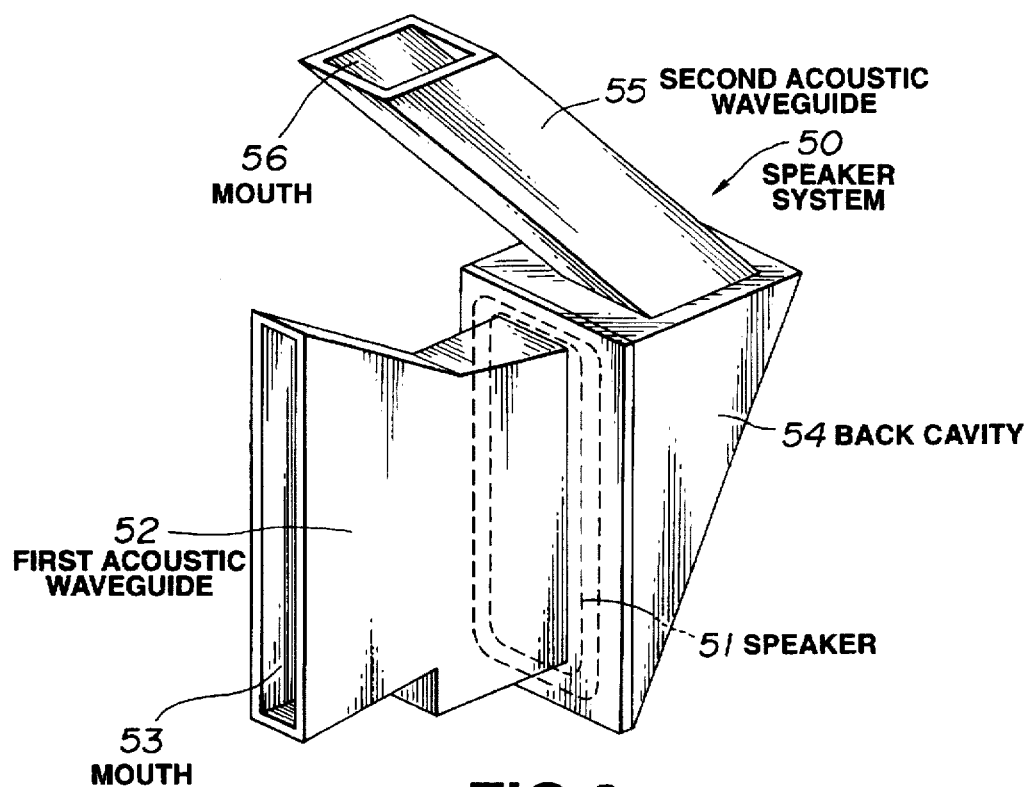
FIG. 1 is a perspective view showing the first embodiment of a speaker system according to the present invention.
Figure 2:
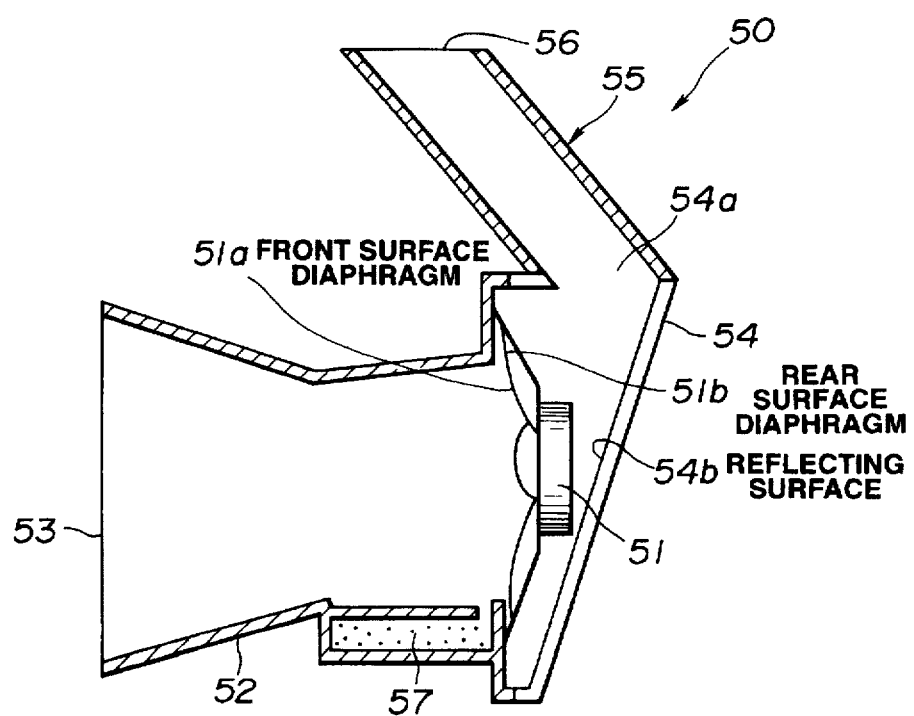
FIG. 2 is a vertically sectioned view of FIG. 1.

FIG. 1 is a perspective view showing the first embodiment of a speaker system according to the present invention. FIG. 2 is its vertically sectioned view.

In FIGS. 1 and 2, the reference numeral 50 represents a speaker system. A first acoustic waveguide 52 having a mouth 53 smaller than the area of a front surface diaphragm 51a is arranged on the front of the speaker 51 and is provided with a sound absorbing material 57 for preventing resonance with a specific frequency in the interior. A back cavity 54 of a reflecting shape (triangular in the cross-section in the drawing) in which standing waves are hard to generate is arranged on the rear surface of a rear surface diaphragm 51b. A second acoustic waveguide 55 guiding diagonally upward the sound waves reflected by a reflecting surface 54b within the cavity is arranged on a mouth 54a provided in the upper part of the back cavity 54. A mouth 56 radiating sound waves is provided above the acoustic waveguide 55.

When thus formed, the same mass of air will be applied to the front surface diaphragm 51a and rear surface diaphragm 51b and will be an added mass, the low resonance frequency f0 of the speaker 51 will fall and substantially the same level low frequency range will be able to be efficiently radiated from the mouths 53 and 56. By the way, the second acoustic waveguide 55 may be formed integrally with the back cavity 54 or may be formed separately from the back cavity 54 and may be secured to the back cavity 54 by such securing means as screws or a bonding agent.

Figure 3:
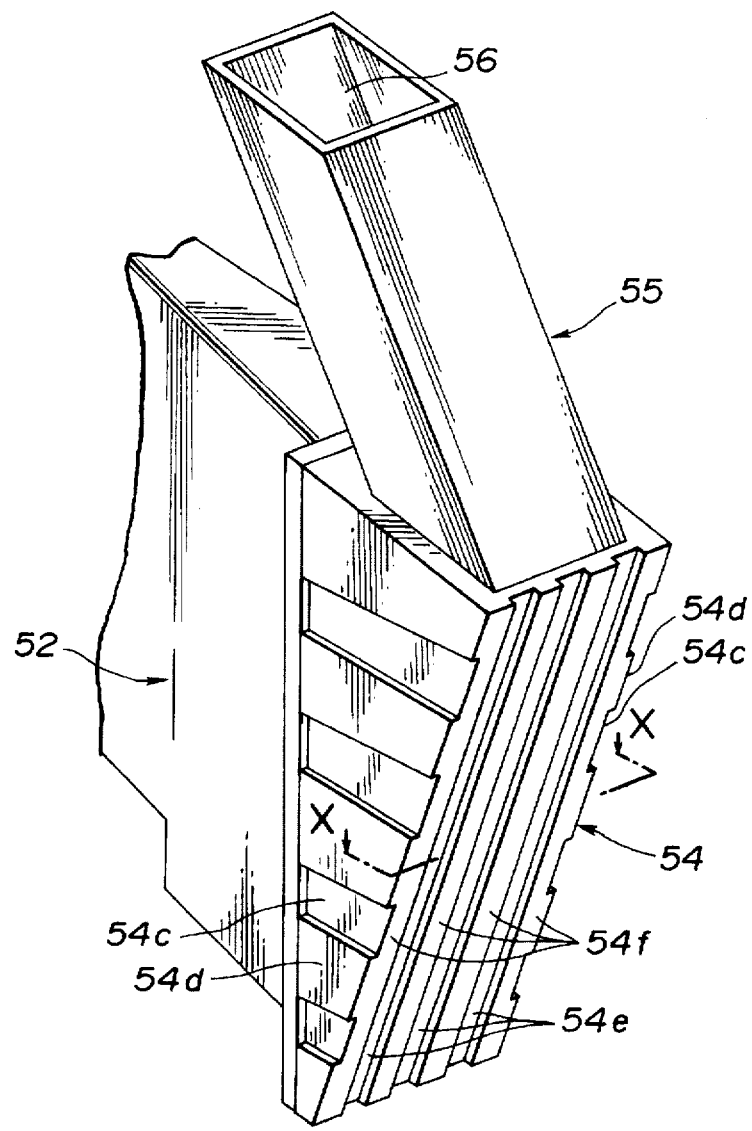
FIG. 3 is a perspective view showing the appearance of an embodiment of a back cavity.
Figure 4:
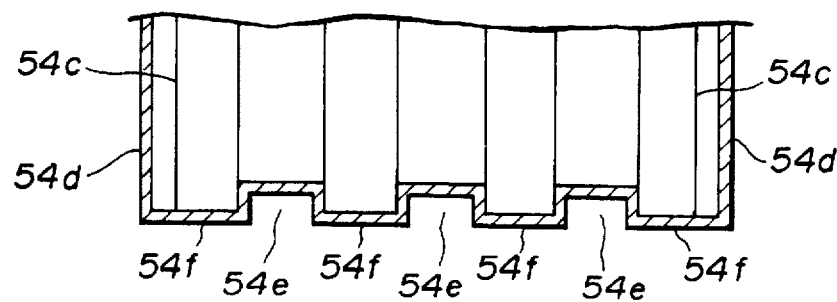
FIG. 4 is a sectioned view on line X—X in FIG. 3.

FIG. 3 shows the appearance of an embodiment of the back cavity 54 in FIG. 1. FIG. 4 shows a sectioned view on line X—X in FIG. 1. This back cavity 54 is molded of a synthetic resin. Indentations are formed by alternating elements 54c and 54d in lateral stripes on the right and left side surfaces of the cavity 54, which causes the inside surfaces of the respective side surfaces of the cavity 54 to have corresponding contours. Indentations are formed by altering elements 54e and 54f in longitudinal stripes on the back surface of the cavity 54, which causes the inside surface of the back surface of the cavity 54 to have corresponding contours.

Figure 17:
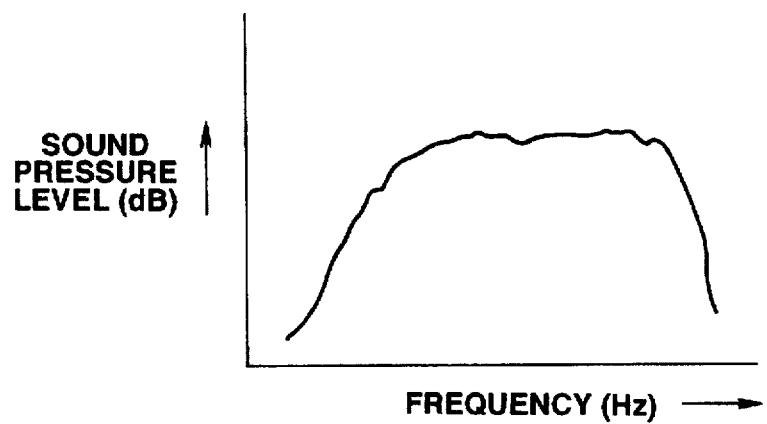
FIG. 17 is a view showing the frequency characteristics of the speaker system in FIG. 16.
Figure 18:
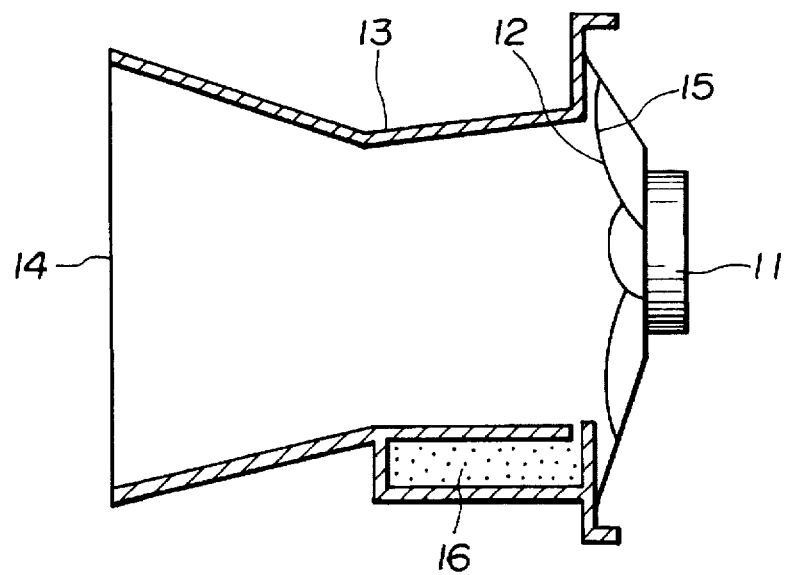
FIG. 18 is a vertically sectioned view showing a speaker system of another conventional example.
Figure 19:
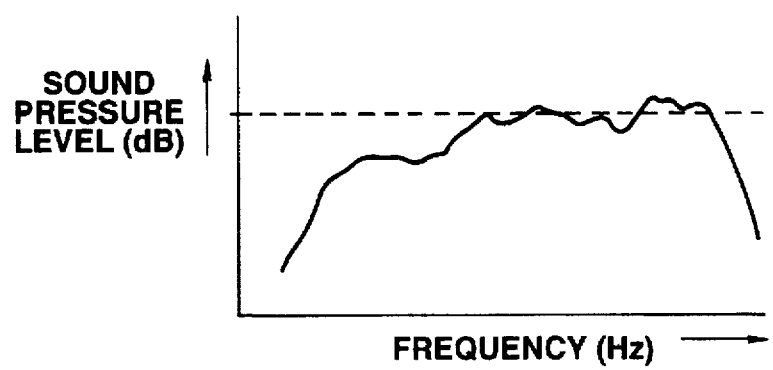
FIG. 19 is a view showing the frequency characteristics in the mouth of the acoustic waveguide in FIG. 18.
Figure 20:
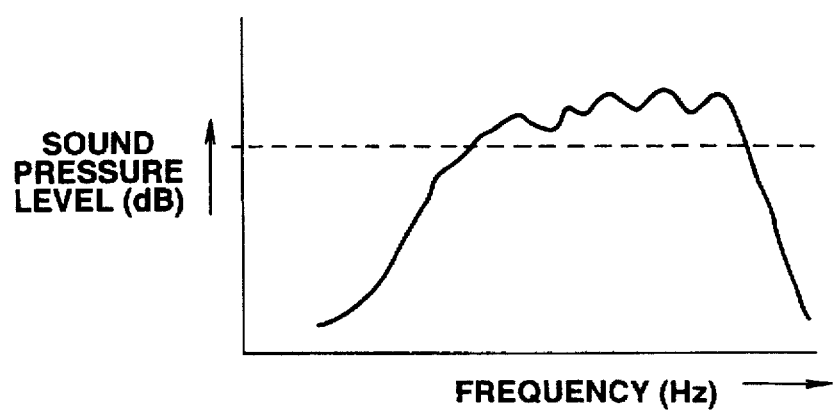
FIG. 20 is a view showing the frequency characteristics in the rear surface diaphragm in FIG. 18.

Because the inside surface of the back cavity 54 has indentations formed by altering elements (54c and 54d) and (54e and 54f), it becomes difficult to generate standing waves. Thus, standing waves that deteriorate the sound quality will be able to be prevented and the conventionally required sound absorbing material within the cavity (see FIG. 17) is unnecessary.

Figure 5:
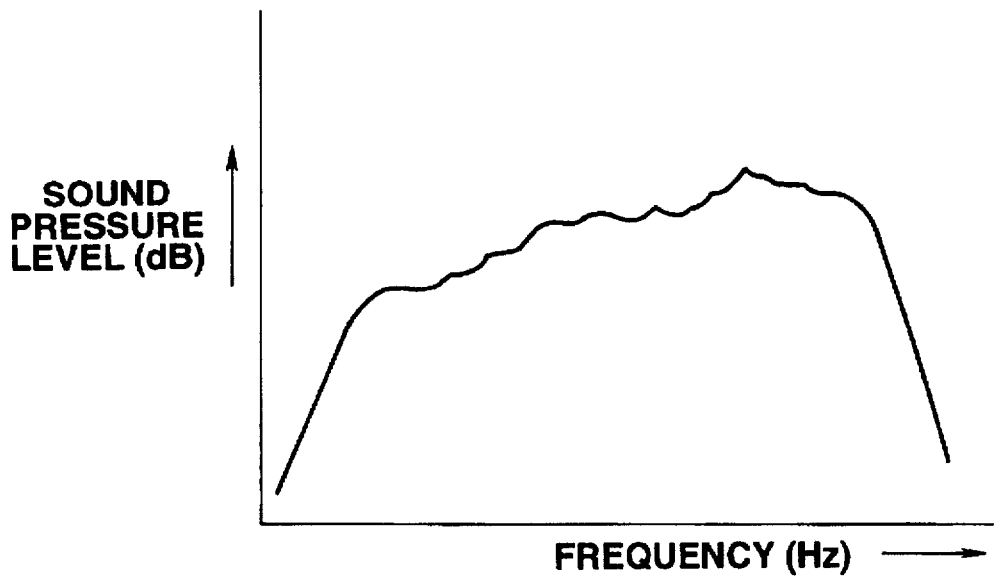
FIG. 5 is a view showing frequency characteristics in the mouth of the first acoustic waveguide in FIG. 1.

The operations of the speaker system of the above mentioned formation shall be explained in the following:

The sound waves radiated from the front surface diaphragm 51a of the speaker 51 pass through the first acoustic waveguide 52 and the sound waves of all the bands reduced in the low resonance frequency f0 are radiated. The frequency characteristics in the mouth 53 of the first acoustic waveguide are shown in FIG. 5. Also, the sounds coming out of the rear surface diaphragm 51b of the speaker 51 pass through the second acoustic waveguide 55 guiding sound waves from the back cavity 54 of a small volume reflecting sound waves and the sound waves of all the bands reduced in the low resonance frequency f0 are radiated at the mouth 56. The frequency characteristics in the mouth 56 of the second acoustic waveguide 55 are shown in FIG. 6.

Figure 6:
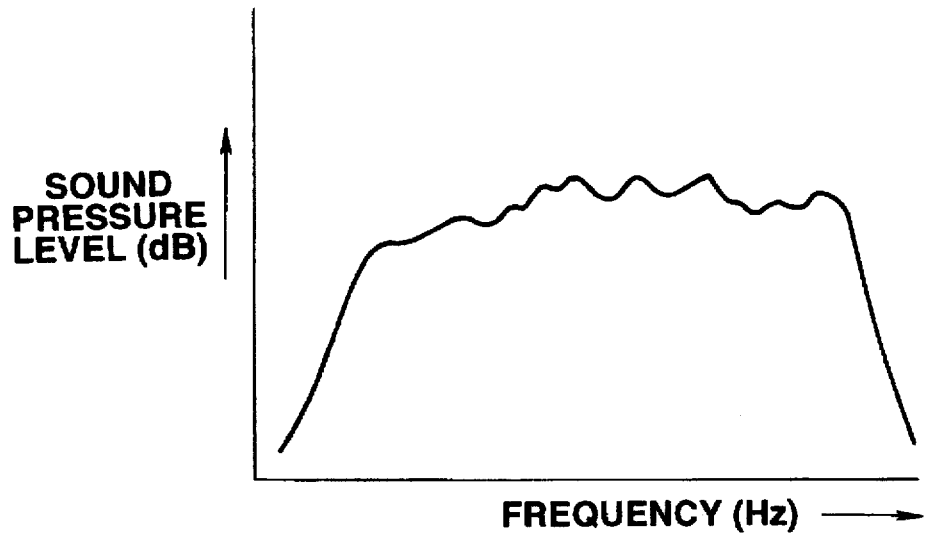
FIG. 6 is a view showing frequency characteristics in the mouth of the second waveguide in FIG. 1.

As shown in FIGS. 5 and 6, the frequency characteristics of the mouth 53 on the front side and the frequency characteristics of the mouth 56 on the rear side are substantially the same characteristics. The radiated sound waves become substantially the same as the sound pressure level of all the bands from the front and rear of the diaphragm of the speaker 51.

Figure 7:
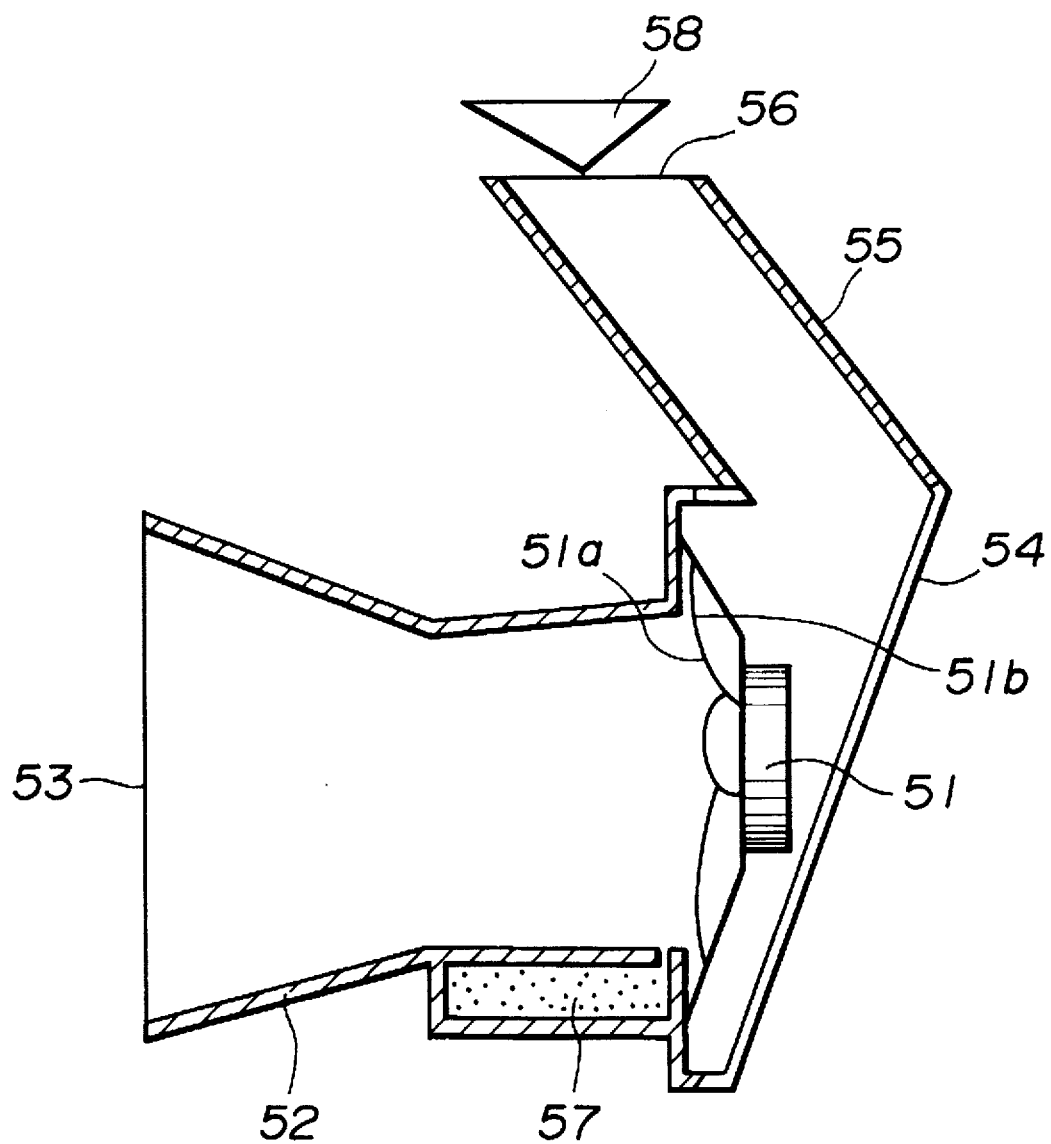
FIG. 7 is a vertically sectioned view showing the second embodiment of a speaker system according to the present invention.

FIG. 7 is a vertically sectioned view showing the second embodiment of a speaker system according to the present invention. This embodiment shows an example that the reflecting member 58 is fitted to the upper part of the mouth 56 in the embodiment in FIG. 1. The reflector 58 is formed, for example, of a substantially conical reflecting plate. This reflecting member 58 is fitted to the upper part of the mouth 56 of the second acoustic waveguide 55 by means of a fitting member not illustrated. With the reflecting member 58 fitted, the sound waves can be diffused in the range of 360 degrees in the horizontal direction or, with the reflecting member 58 and fitting member devised in the form, the sound waves can be diffused and radiated in a specific range in the horizontal direction. The reflecting member 58 is not limited to be substantially conical as illustrated but may be like a flat plate or may be variable in the radiating direction.

Figure 8:
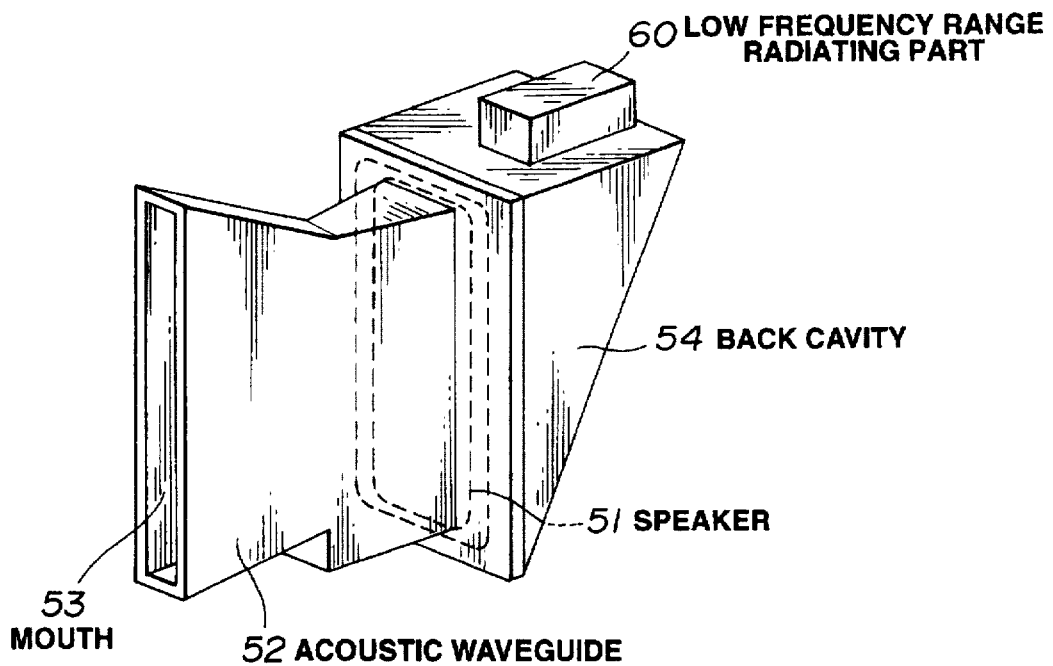
FIG. 8 is a perspective view showing the third embodiment of a speaker system according to the present invention.
Figure 9:
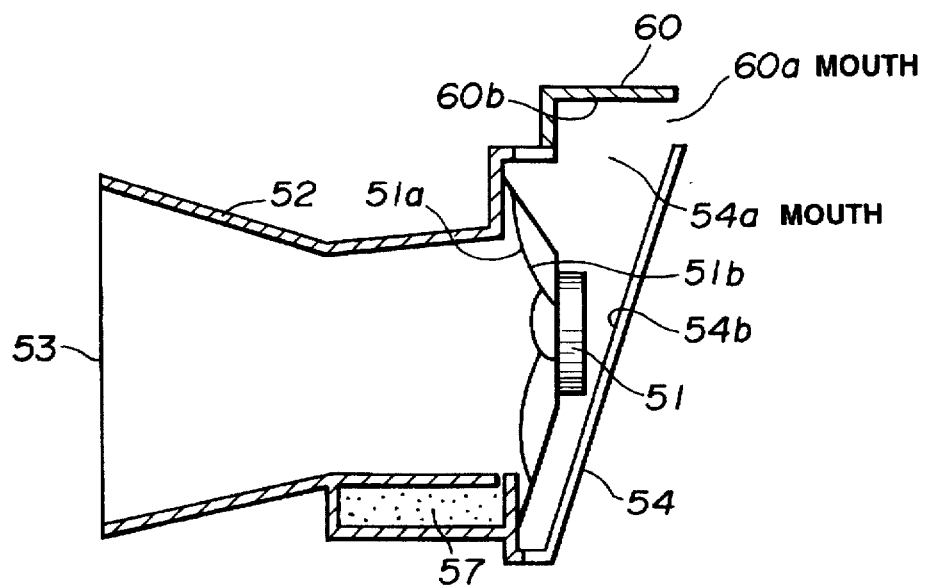
FIG. 9 is a vertically sectioned view of FIG. 8.

FIG. 8 is a perspective view showing the third embodiment of a speaker system according to the present invention. FIG. 9 is its vertically sectioned view.

As shown in FIGS. 8 and 9, the first acoustic waveguide 52, which is in cross sectional area smaller than the area of the front surface of diaphragm 51a, is arranged on the front of the speaker 51. A sound absorbing material 57 for preventing the internal resonance is arranged in the acoustic waveguide 52. A mouth 53 for radiating the sound waves is provided in front of the acoustic waveguide 52. A back cavity 54 of a reflecting shape (of a triangular cross-section in the drawing) wherein standing waves are not easily generated is arranged on the rear surface of the rear surface diaphragm 51b. Further, a rectangular mouth 54a is provided in the upper part of the back cavity 54. A low frequency range radiating part 60 radiating from an mouth 60a only the low frequency range of the sound waves reflected by the reflecting surface 54b within the cavity is provided to be like a box on the mouth 54a. The low frequency range radiating part 60 is projected and provided to be box-like in the form of throttling a part of the upper surface of the cavity 54 and a mouth 60a is formed at one end (on the rear side in the drawing) of the projected part.

When thus formed, as the same added mass is applied to the front surface diaphragm 51a and rear surface diaphragm 51b, the low resonance frequency f0 will be reduced and substantially the same level low frequency range will be able to be efficiently radiated from the mouth 53 of the acoustic waveguide 52 and the mouth 60a of the low frequency range radiating part 60.

The low frequency range radiating part 60 may be formed integrally with the back cavity 54 or may be formed separately from the back cavity 54 and may be secured to the cavity 54 by such securing means as screws or a bonding agent.

Figure 21:
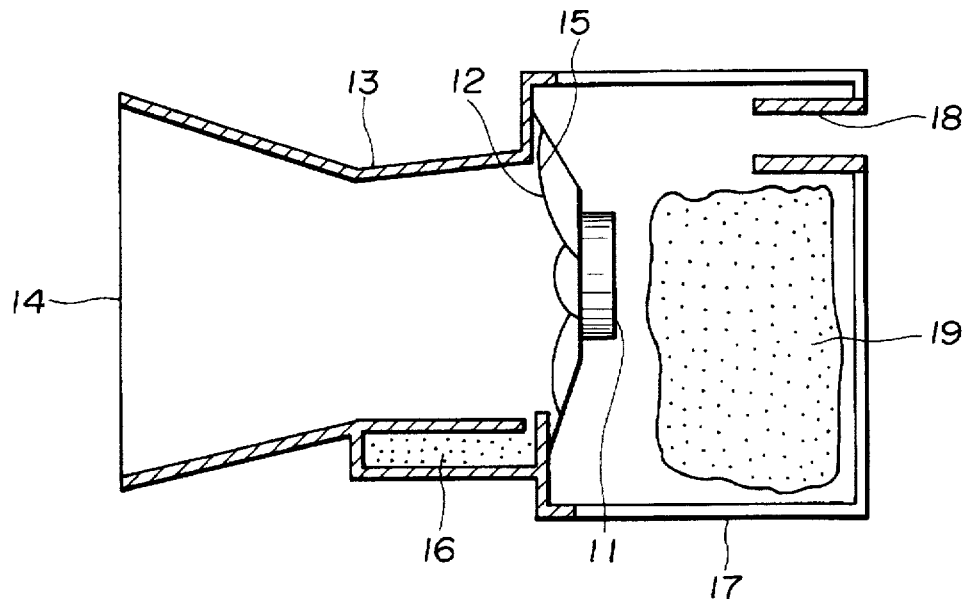
FIG. 21 is a vertically sectioned view showing a speaker system of another conventional examples.
Figure 22:
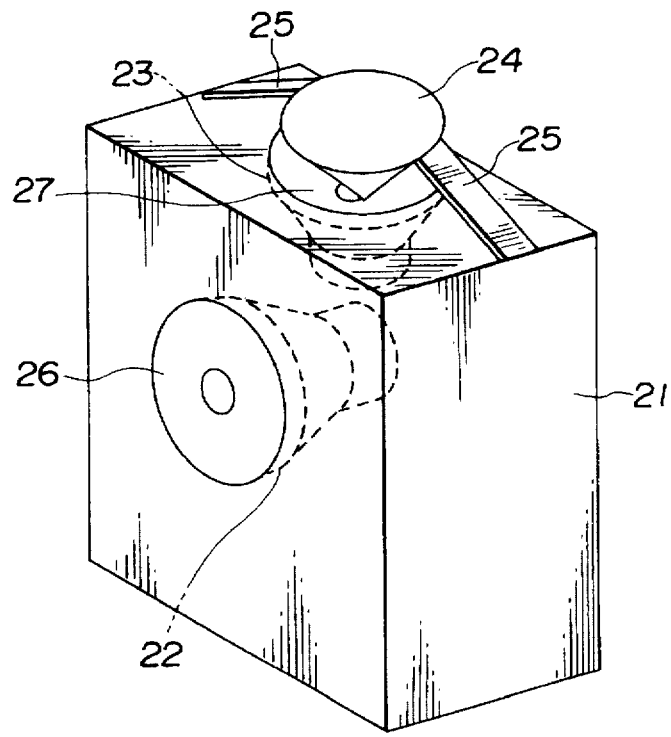
FIG. 22 is a perspective view showing a speaker system of another conventional examples.
Figure 23:
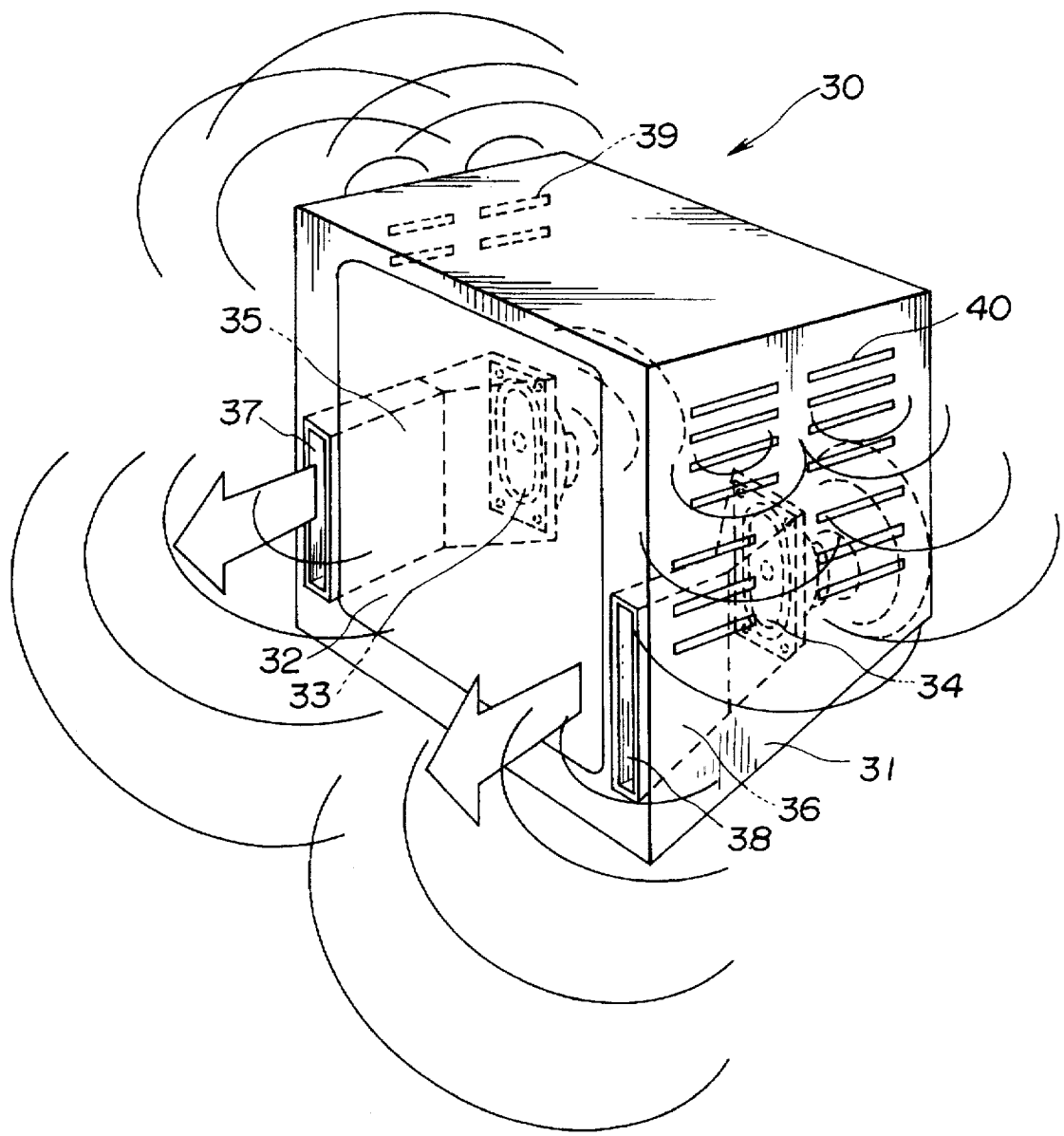
FIG. 23 is a perspective view showing a speaker system of a conventional television set.
Figure 24:
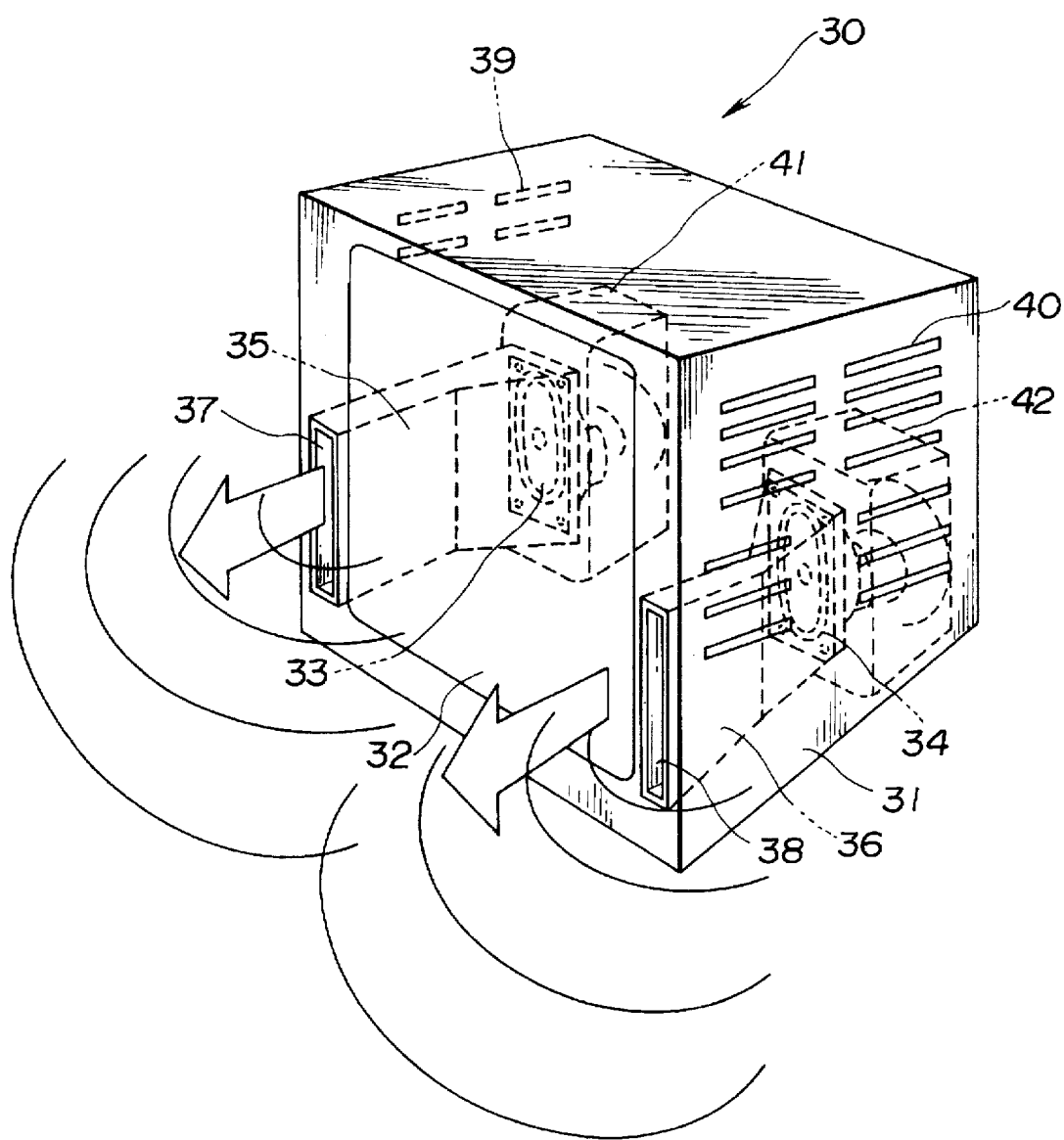
FIG. 24 is a perspective view showing a speaker system of a television set of another conventional example.

Also, in the embodiments shown in FIGS. 8 and 9, if the insides of the side surface and back surface of the back cavity 54 are formed to have indentations in the manner described with respect to FIGS. 3 and 4, the standing waves which deteriorate sound quality will be more easily prevented, and conventionally required sound absorbing material within the cavity (See FIG. 21) will be unnecessary.

Figure 10:
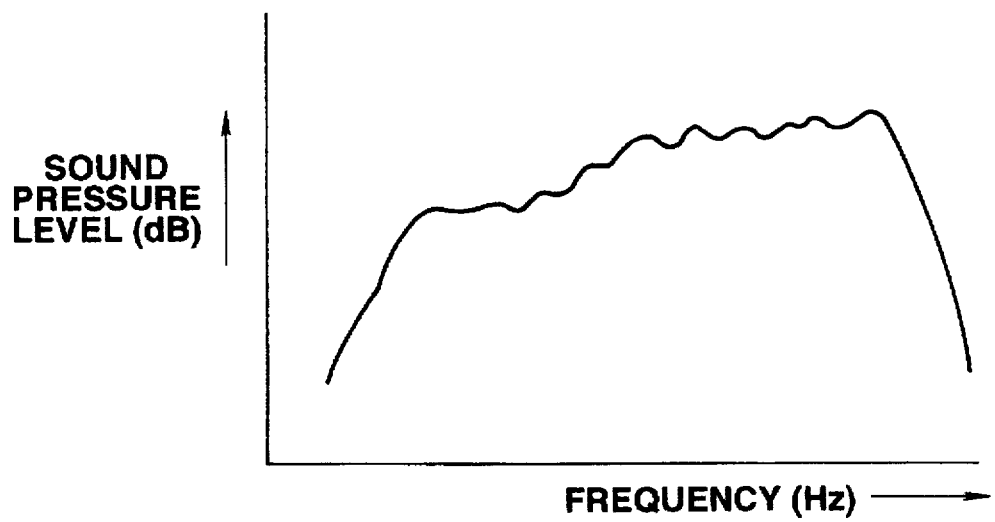
FIG. 10 is a view showing frequency characteristics in the mouth of the acoustic waveguide in FIG. 8.
Figure 11:
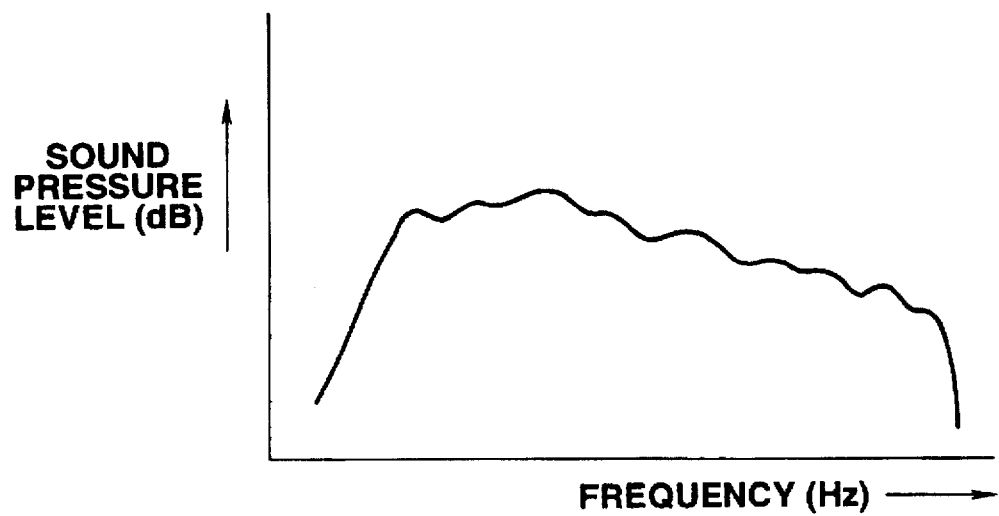
FIG. 11 is a view showing frequency characteristics in the mouth of the low frequency range radiating part in FIG. 8.

The operations of the speaker system of the above mentioned formation shall be explained in the following:

The sound waves radiated from the front surface diaphragm 51a of the speaker 51 pass through the first acoustic waveguide 52 and the sound waves of all the bands reduced in the low resonance frequency f0 are radiated at the mouth 53. FIG. 10 shows the frequency characteristics at the mouth 53 of the first acoustic waveguide 52. The sounds coming out of the rear surface diaphragm 51b of the speaker 51 pass through the back cavity 54 of a small volume reflecting the sound waves, are reflected by the top plate 60b of the low frequency range radiating part 60 from the throttled mouth 54a and are radiated from the mouth 60a. When the sound waves are throttled by the mouth 54a and are reflected by the top plate 60b, a low frequency range filter will be made, the unnecessary midrange and high frequency sound regions will be attenuated and only the low frequency range will be able to be efficiently radiated. FIG. 11 shows the frequency characteristics at the mouth 60a of the low frequency range radiating part 60.

As shown in FIGS. 10 and 11, the frequency characteristics of the mouth 53 on the front side and the frequency characteristics of the mouth 56 on the rear side are substantially the same characteristics on the low frequency range and the sounds having a low frequency range stressed expansion and presence are to be radiated from the front and rear of the diaphragm of the speaker 51.

As described above, according to the embodiment of the present invention, even with the small slim box type speaker system, bass sound can be well reproduced, a clear sound quality is obtained, an expansion and presence are obtained with few speakers and a speaker system advantageous to the cost can be realized.

Figure 12:
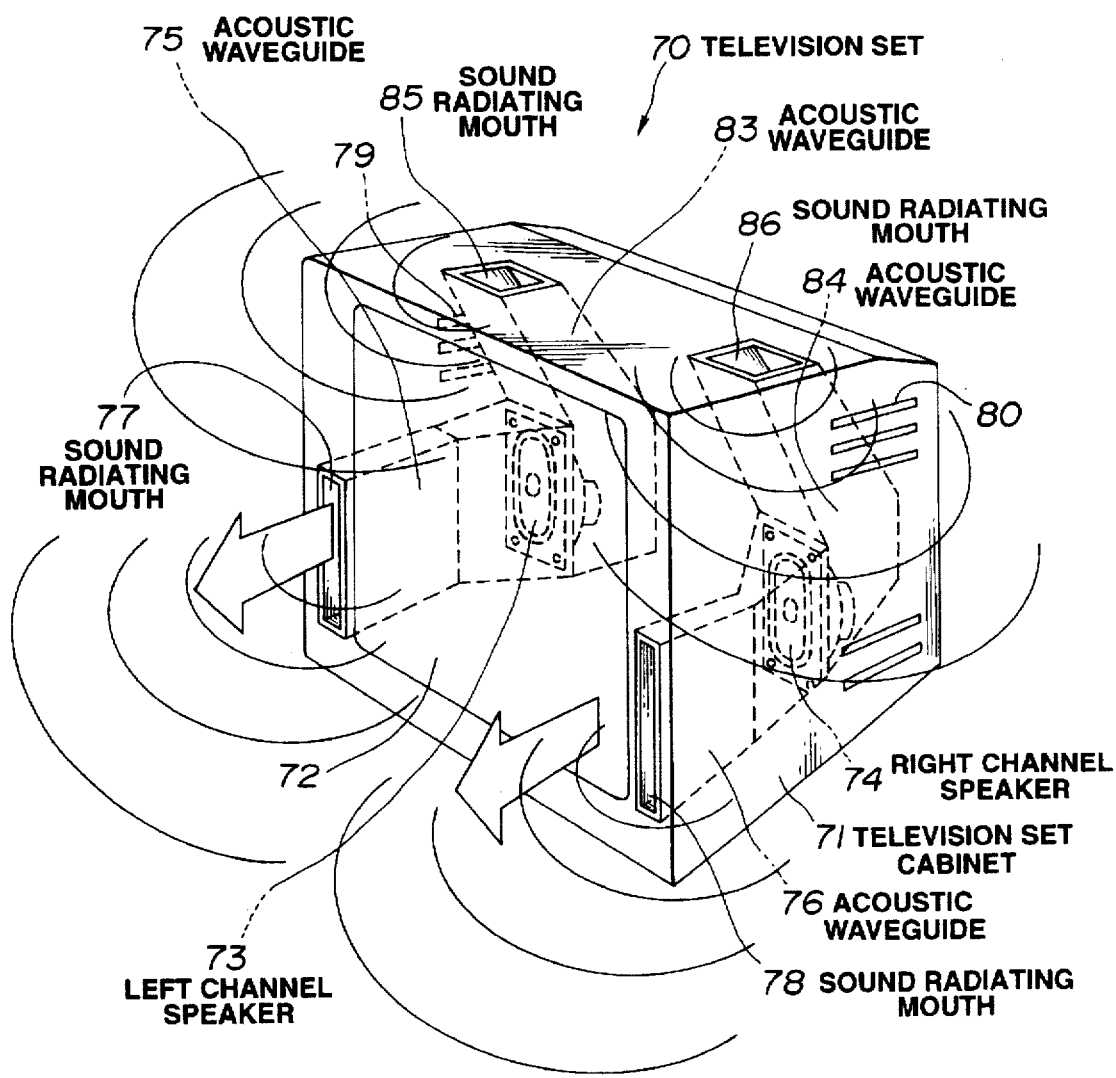
FIG. 12 is a perspective view showing an embodiment of a speaker system for television sets according to the present invention.

FIG. 12 is a perspective view showing a speaker system for television sets embodying the present invention.

In FIG. 12, the reference numeral 70 represents a television set and, within a television set cabinet 71, right and left channel speakers 74 and 73 are arranged respectively in the right and left positions on both sides of a cathode ray tube 72 forming a display. Acoustic waveguides 76 and 75 are fitted respectively to the front parts of the right and left channel speakers 74 and 73 and sound radiating mouths 78 and 77 of the right and left acoustic waveguides 76 and 75 are arranged on the front panel (front surface panel) of the television cabinet 71. The sound radiating mouths 78 and 77 are connected respectively to sound radiating holes provided respectively in the right and left positions on the front panel.

Acoustic waveguides 84 and 83 are fitted respectively to the rear parts of the right and left channel speakers 74 and 73. These right and left acoustic waveguides 84 and 83 are formed to extend upward from the rear of the speaker diaphragm and bend diagonally forward (substantially like <). Sound radiating mouths 85 and 86 respectively of the acoustic waveguides 83 and 84 are arranged on the top surface of the television cabinet 71. The sound radiating mouths 86 and 85 are connected respectively to sound radiating holes provided in the right and left positions on the top surface.

In such formation, the sounds radiated from the front of the diaphragms of the right and left channel speakers 74 and 73 are radiated forward of the television set from the right and left sound radiating mouths 78 and 77 respectively through the right and left acoustic waveguides 76 and 75. At the same time, the sounds radiated from the rear of the diaphragms of the right and left channel speakers 74 and 73 are respectively radiated upward of the television set 70 from the right and left sound radiating mouths 86 and 85 while being reflected by the inside surfaces of the right and left acoustic waveguides 84 and 83. That is to say, as the right and left acoustic waveguides 84 and 83 extend upward from the spaces in the rear of the respective speaker diaphragms and incline diagonally forward, the sounds radiated from the rear of the respective diaphragms will be guided upward while being reflected by the inside surfaces of the respective acoustic waveguides 84 and 83 and will be radiated forward. Here, as a mass of air is applied to the front and rear of the speaker diaphragm within the front acoustic waveguide 75 (or 76) and the rear acoustic waveguide 83 (or 84) and becomes a load mass, the low resonance frequency f0 on the front and rear surfaces of the speaker 73 (or 74) will fall and the reproduced band will be able to be expanded. Further, as the frequency characteristics (sound pressure level against frequency) of the sounds radiated respectively from the front and rear of the speaker 73 (or 74) are also the same, there will be no such defect as the front sounds being masked by the rear sounds and a clear sound quality will be able to be obtained.

Further, as the sounds are radiated from a total of four places on the front surface and upper surface of the television set 70, a wide clear sound quality will be able to be reproduced with a natural expansion feeling. Further, as the sounds are radiated with only two right and left speakers, a highly efficient speaker system high in the cost performance will be able to be built.

Figure 13:
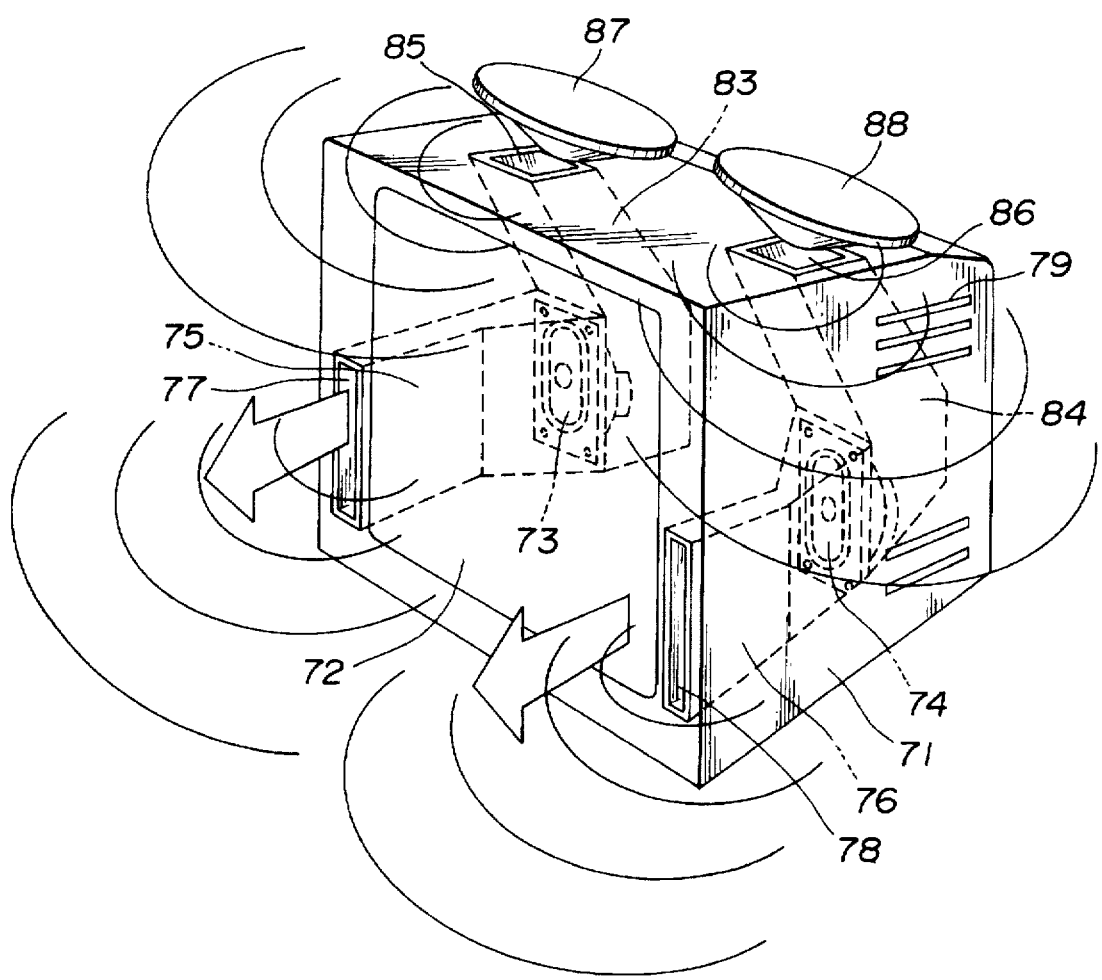
FIG. 13 is a perspective view showing another embodiment of a speaker system for television sets according to present invention.
Figure 14:
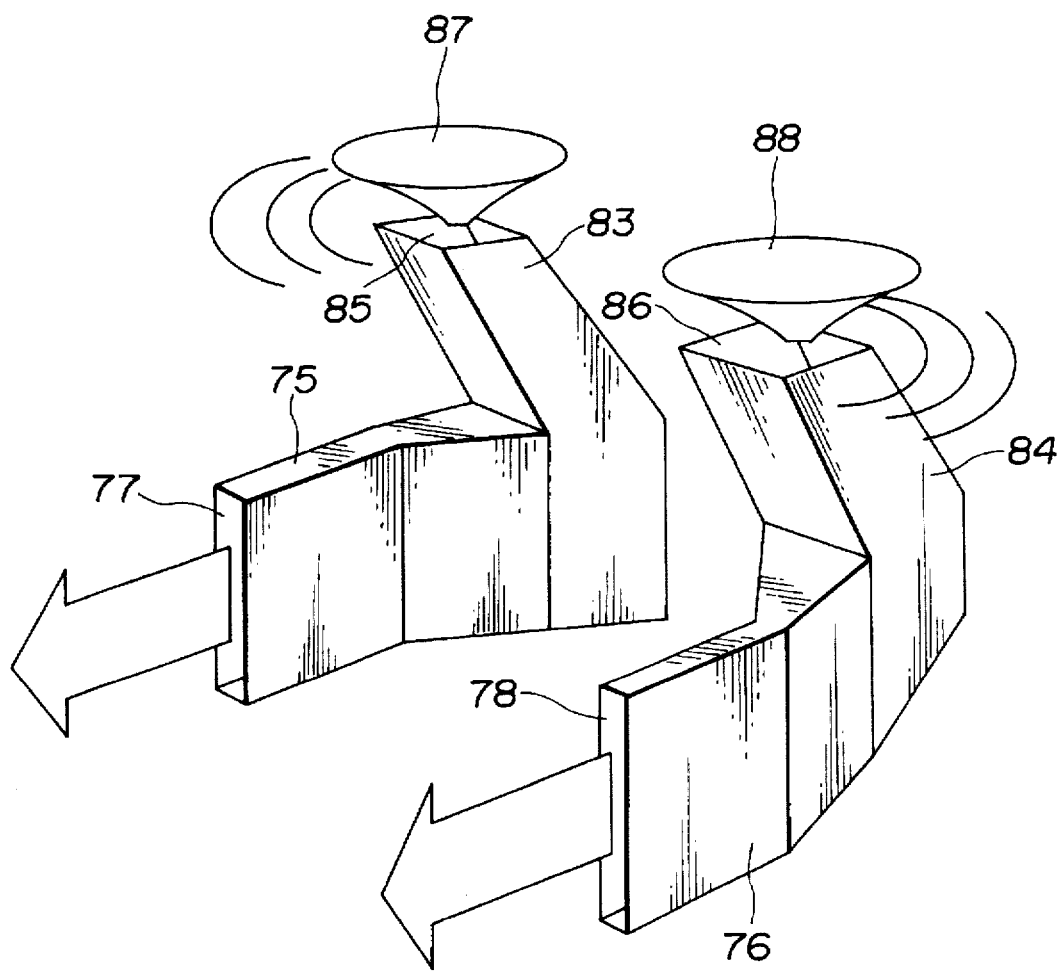
FIG. 14 is a perspective view showing a formation modeling the system in FIG. 13.

FIG. 13 is a perspective view showing another embodiment of the present invention. FIG. 14 is a perspective view showing a formation modeling the system in FIG. 13.

In the embodiment in FIG. 13, reflecting members 88 and 87 are arranged respectively above the above mentioned right and left sound radiating mouths 86 and 85 arranged near the top surface of the television set 70 in FIG. 11 so that the sounds radiated from the mouths 86 and 85 may be efficiently radiated in the direction (diagonally forward) of the audience.

Figure 15:
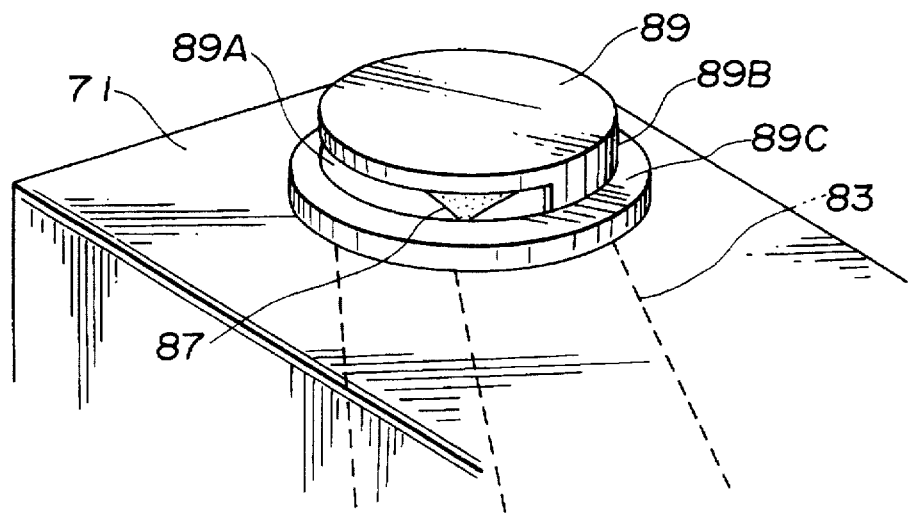
FIG. 15 is a perspective view showing a formation example for fitting the reflecting member in FIG. 13 to the television set cabinet on the top surface.
Figure 16:
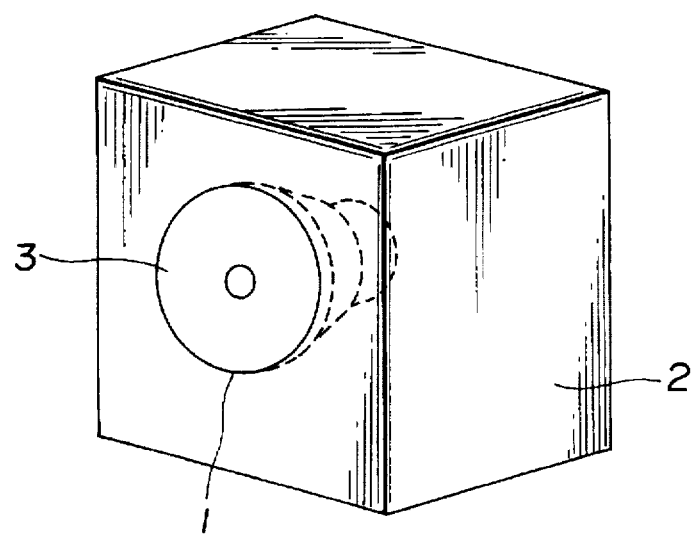
FIG. 16 is a perspective view showing a conventional speaker system.

FIG. 15 shows an example of formation for fitting the reflecting member 87 (or 88) to the top surface of the television set cabinet 71.

In FIG. 15, the reflecting member 87 is substantially conical and is formed integrally on the inside surface of a fitting member 89 or is secured to the inside surface of the fitting member 89. The fitting member 89 is formed of a mouth 89A for reflecting the sounds from the acoustic waveguide 83 with the reflecting member 87 and radiating the sounds out, a shielding part 89B formed on the opposite surface of this mouth 89A to lead the sounds toward the mouth 89A and a flange-shaped part 89C for mounting the fitting member 89 on the sound radiating hole (below which is connected the sound radiating mouth 85 of the above mentioned acoustic waveguide (83)) provided on the top surface of the television set cabinet. The sound radiating mouth 85 of the above mentioned acoustic waveguide 83 is connected below the sound radiating hole provided on the top surface of the television set cabinet 71.

As described above, according to the embodiment of the present invention, as the load is balanced on the front and rear surfaces of the speaker diaphragm, there can be realized a speaker system wherein, with few speakers, the sound reproducing band can be made wide, sounds high in the presence can be reproduced and the cost is advantageous.

In the embodiment shown in FIGS. 12 and 13, the television set provided with two speakers for the right and left channels has been explained. However, it is needless to say that the present invention can be used also for a television set provided with only one monaural speaker.

By the way, the present invention is not limited to only the above described embodiments but can be variously modified and worked without deviating from the subject matter of the invention.

What is claimed is:

1. A speaker system, comprising:
   a speaker having a diaphragm for radiating sound waves, said diaphragm having a front surface and a rear surface;
   a first acoustic waveguide for guiding sound waves radiated from the front surface of said diaphragm so that the sound waves are radiated in a forward direction;
   a box joined to an end of said first acoustic waveguide, said box being defined by walls and containing said speaker, one of said walls being a reflecting surface for changing a direction of propagation of sound waves radiated from the rear surface of said diaphragm from a backward direction to a third direction which is different from the forward and backward directions; and
   a second acoustic waveguide joined to said box for guiding the sound waves reflected by said reflecting surface so that the sound waves are radiated in a further different direction;
   wherein the first acoustic waveguide and the second acoustic waveguide are arranged so that approximately the same acoustic load is applied on the front surface and the rear surface of the diaphragm.

2. A speaker system, comprising:
   a speaker having a diaphragm for radiating sound waves, said diaphragm having a front surface and a rear surface;
   a first acoustic waveguide for guiding sound waves radiated from the front surface of said diaphragm so that the sound waves are radiated in a forward direction;
   a box joined to an end of said first acoustic waveguide, said box being defined by walls and containing said speaker, one of said walls forming a reflecting surface for changing a direction of propagation of sound waves radiated from a rear surface of said diaphragm from a backward direction to a third direction which is different from the forward and backward directions;
   a second acoustic waveguide joined to said box for guiding sound waves reflected by a reflecting part so that the sound waves are radiated in a further different direction; and
   a reflecting member provided proximate the mouth of said second acoustic waveguide, for at least one of diffusing the sound waves and determining a radiating direction of the sound waves from the mouth;
   wherein the first acoustic waveguide and the second acoustic waveguide are arranged so that approximately the same acoustic load is applied on the front surface and the rear surface of the diaphragm.

3. A speaker system according to claim 1 or 2, further comprising an acoustic apparatus containing the speaker, the first acoustic waveguide, the box and the second acoustic waveguide, and wherein the forward direction is a front direction of said acoustic apparatus and the third direction is an upper direction of said acoustic apparatus.

4. A speaker system, comprising:
   a speaker having a diaphragm for radiating sound waves, said diaphragm having a front surface and a rear surface;
   a first acoustic waveguide for guiding sound waves radiated from the front surface so that the sound waves are radiated in a forward direction;
   a box joined to an end of said first acoustic waveguide, said box containing said speaker and being defined by walls, one of said walls forming a reflecting surface for changing a direction of propagation of sound waves radiated from the rear surface of said diaphragm from a backward direction to a third direction which is different from the forward and backward directions; and a low frequency range radiating part projecting into an upper portion of said box to form a mouth for radiating only the low frequency range of the sound waves reflected by said reflecting surface;

wherein the first acoustic waveguide and low frequency range radiating part are arranged so that approximately the same acoustic load is applied on the front surface and the rear surface of the diaphragm.

5. A speaker system according to claim 1, 2 or 4, wherein an inside surface of at least one wall of said box has indentations to prevent standing waves from being generated.

6. A television set including a speaker system, comprising:

a television cabinet having a front surface and a top surface;

a speaker disposed in said television cabinet having a diaphragm, said diaphragm having a front surface and a rear surface;

a first acoustic waveguide for guiding sound waves radiated from the front surface of said diaphragm in a forward direction through a sound radiating mouth attached to said front surface of said television cabinet; and a second acoustic waveguide for guiding sound waves radiated from the rear surface of said diaphragm in a backward direction, said second acoustic waveguide having a reflecting part which reflects said sound waves traveling in said backward direction in a direction which is towards an outward direction of the television cabinet and which is different from said forward and backward directions;

wherein the first acoustic waveguide and the second acoustic waveguide are arranged so that approximately the same acoustic load is applied on the front surface and the rear surface of the diaphragm.

7. The television set including a speaker system according to claim 6, wherein:

said direction which is towards an outward direction of the television cabinet and which is different from said forward and backward directions is towards the top surface of said television set.

8. The television set including a speaker system according to claim 6, wherein said second acoustic waveguide has a mouth for radiating sound waves towards the outside of said television set; and a reflecting member for diffusing sound waves and for giving a feeling of expansion to a listener is disposed near said mouth of said second acoustic waveguide.

9. A speaker system for use in a television set, said television set having a cabinet having a top surface, a front surface and side surfaces, and containing a display and said speaker system, said speaker system having left and right channels, comprising:

first and second speakers for left and right channels disposed respectively on a left side and a right side of a display of said television set, each of said first and second speakers having a diaphragm for generating sound waves, each of said diaphragms having a front surface and a back surface;

first and second acoustic waveguides for guiding sound waves radiated from the front surface of the diaphragm of each of said first and second speakers in a first direction towards said display, and for radiating the sound waves out of the front surface of said cabinet; and third and fourth acoustic waveguides disposed within said cabinet respectively joined to ends of said first and second acoustic waveguides and respectively containing said first and second speakers, said third and fourth acoustic waveguides guiding sound waves radiated from the rear surface of the diaphragm of each of said first and second speakers in a second direction different from said first direction, and for radiating the sound waves out of a surface of said cabinet other than the front surface of said cabinet;

wherein the first and second acoustic waveguides and the third and fourth acoustic waveguides are arranged so that approximately the same acoustic load is applied on the front surface and the rear surface of each respective diaphragm.

10. A speaker system for use in a television set according to claim 9, wherein:

said third and fourth acoustic waveguides guide sound waves radiated from each said rear surface of said speaker diaphragms after changing a direction of propagation of the sound waves.

11. A speaker system for use in a television set according to claim 9 or 10, wherein:

a sound radiating direction of said third and fourth acoustic waveguides is towards the top surface of the television set.

12. A speaker system for use in a television set according to claim 9 or 10, wherein:

each of said third and fourth acoustic waveguides have a mouth for radiating sound waves; and wherein reflecting members for diffusing sound waves and for giving a feeling of expansion to a listener are disposed respectively near said mouths of said third and fourth acoustic waveguides.

13. The television set including a speaker system according to claim 6, wherein:

said second acoustic waveguide has a mouth for radiating sound waves;

a sound guiding direction of said mouth of said second acoustic waveguide is towards the top surface of said television set; and a reflecting member for diffusing sound waves and for giving a feeling of expansion to a listener is disposed proximate said mouth of said second acoustic waveguide.

14. A speaker system for use in a television set according to claim 9 or 10, wherein:

each of said third and forth acoustic waveguides has a mouth for radiating sound waves;

sound guiding directions of mouths of said third and fourth acoustic waveguides are towards the top surface of said television set; and reflecting members for diffusing sounds and for giving a feeling of expansion to a listener are disposed proximate to said mouths of each of said third and fourth acoustic waveguides.

* * * * *